United States Patent
Aizawa

(10) Patent No.: US 9,648,174 B2
(45) Date of Patent: May 9, 2017

(54) NETWORK RELAY DEVICE

(75) Inventor: Yukio Aizawa, Higashiibaraki-gun (JP)

(73) Assignee: HITACHI METALS, LTD., Tokyo (JP)

( * ) Notice: Subject to any disclaimer, the term of this patent is extended or adjusted under 35 U.S.C. 154(b) by 1023 days.

(21) Appl. No.: 13/343,914

(22) Filed: Jan. 5, 2012

(65) Prior Publication Data
US 2012/0197561 A1    Aug. 2, 2012

(30) Foreign Application Priority Data
Jan. 27, 2011   (JP) .................... 2011-015479

(51) Int. Cl.
  *H04M 19/08*   (2006.01)
  *H04L 12/10*   (2006.01)
(52) U.S. Cl.
  CPC ............. *H04M 19/08* (2013.01); *H04L 12/10* (2013.01)
(58) Field of Classification Search
  CPC .................................................... H04M 19/08
  USPC ........................................................ 702/61
  See application file for complete search history.

(56) References Cited

U.S. PATENT DOCUMENTS 8,086,728 B2 * 12/2011 Nasnas ..................... 709/224
8,401,587 B2   3/2013 Minemura
2006/0120394 A1 * 6/2006 Kim .................... H04L 49/351
                                                    370/419
2009/0108680 A1   4/2009 Minemura
2012/0200398 A1   8/2012 Minemura

FOREIGN PATENT DOCUMENTS

| JP | 2004-200933 A | 7/2004 |
| JP | 2007-192758 A | 8/2007 |
| JP | 2009-112155 A | 5/2009 |
| JP | 2010-175388 A | 8/2010 |

OTHER PUBLICATIONS

Japanese Office Action, Oct. 22, 2013, 4 pages.

* cited by examiner

*Primary Examiner* — Ricky Ngon
(74) *Attorney, Agent, or Firm* — Foley & Lardner LLP

(57) ABSTRACT

A network relay device includes a main functional portion including a relaying function for network communication, a power supply portion for converting an AC current taken from an external AC power supply to a DC current, and providing the DC current to the main functional portion, a measuring unit for measuring a value of the DC current, after the conversion to the DC current provided from the power supply portion to the main functional portion, and a computing unit for computing a total power consumption of a whole including the main functional portion and the power supply portion, based on a result measured by the measuring unit.

10 Claims, 4 Drawing Sheets

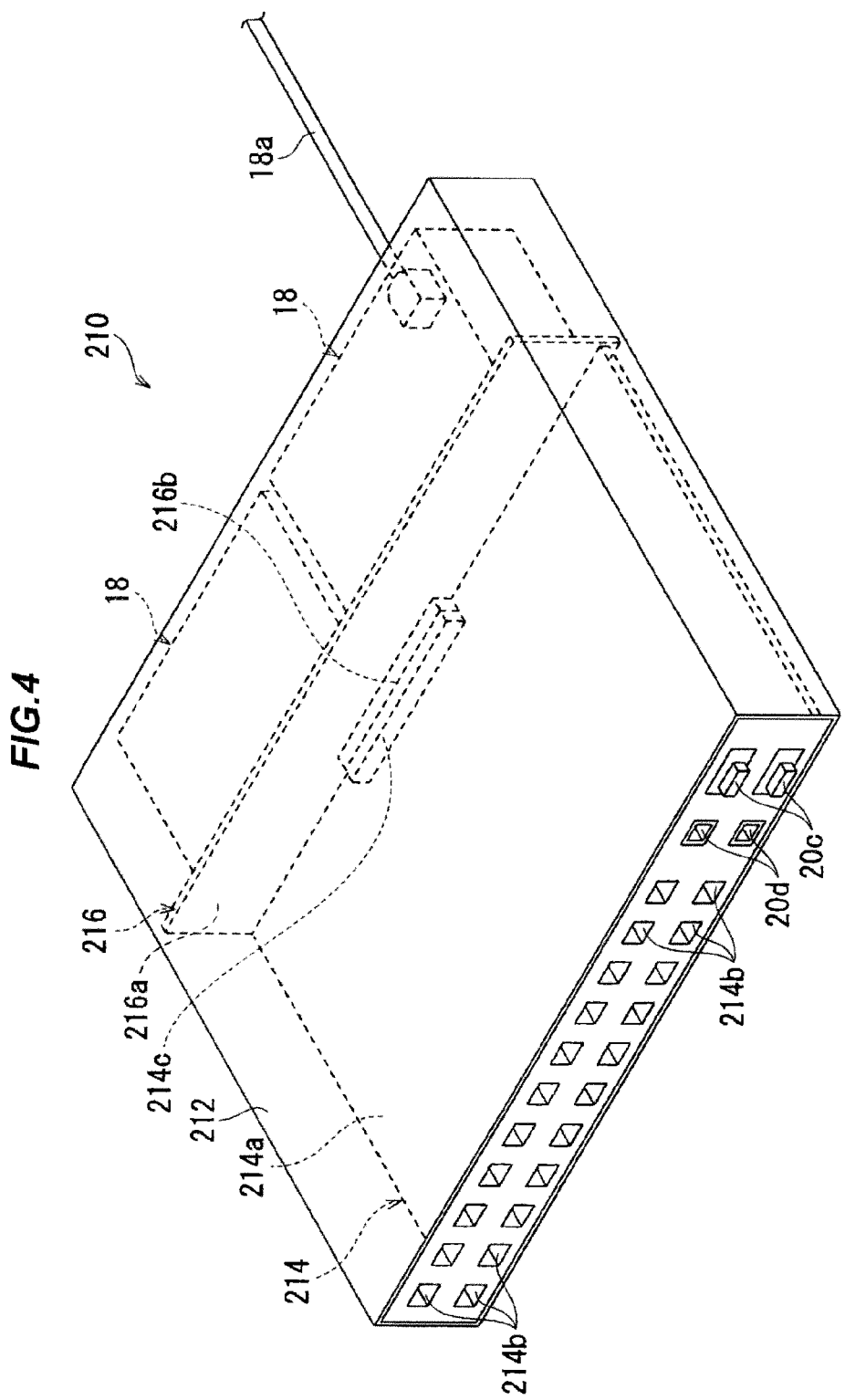

NETWORK RELAY DEVICE

The present application is based on Japanese patent application No 2011-015479 filed on Jan. 27, 2011, the entire contents of which are incorporated herein by reference.

BACKGROUND OF THE INVENTION

1. Field of the Invention

This invention relates to a network relay device.

2. Description of the Related Art

In recent years, from the point of view of energy savings or carbon dioxide ($CO_2$) emission reductions, it has been desired to measure actual power consumptions separately for electronic devices for business uses, such as network relay devices, gather and total results thereof and manage energy efficiency per establishment. The term "establishment" here refers to, for example, a data center, a communication base station, etc. in which numerous network relay devices, server devices, etc. are installed.

In view of such social backgrounds, conventional art has been variously suggested that monitors, as the whole of a system, respective separate power consumptions of electronic devices or electric products system connected to each other through a network or a power line.

For example, conventional art (see JP-A-2007-192758) has been known that monitors an integral power consumption of the whole of a system of a plurality of electronic devices system connected to each other through a network, by utilizing a connecting line therefor. In this conventional art, when there are electronic devices constituting, for example, an AV system, such as a display, a player, a speaker and the like, power information acquiring portions are installed in them respectively, to monitor their respective power consumptions separately, and output results thereof from communication portions respectively to the network.

Also, another conventional art system (see JP-A-2010-175388) has been known that monitors respective power consumptions of electric products of each kind connected to home wiring. In this conventional art, any one of the electric products (e.g. a television) connected to the home wiring is provided with a center function for being able to display, as visible information, total power consumption information measured by a power meter and the respective power consumptions of the electric products connected to the home wiring. The home electric products each have a built-in information device with a power measuring circuit and a communication portion for allowing the measured power consumption information of each of the electric products to be gathered and totaled by the electric product provided with the center function.

These conventional arts are useful in that the respective measured power consumptions of the plural electronic devices or electric products are gathered and totaled by network communication, so that the power consumptions thereof as the whole of the system can be easily grasped.

SUMMARY OF THE INVENTION

In the above mentioned conventional art power consumption monitoring methods, in general, an AC input is monitored at an entrance of a commercial AC power supply for each electronic device, and the power consumption of the electronic device is computed therefrom by a logic circuit (e.g. CPU: Central Processing Unit).

However, the electronic devices of this kind are basically DC driven, and also have different driving voltages respectively, and in practice, are therefore provided with power supply units, respectively and separately, to convert AC voltage to DC voltage, even when connected to the common commercial AC power supply (e.g. AC +100-240V) within the system.

In actually computing the respective power consumptions of the separate electronic devices, this requires a high precision device (ADC: Analog to Digital Converter) for monitoring a phase difference between voltage and electric current acquired from each AC input. The installation cost is therefore relatively high. Also, the monitored results used for the power consumption computing are the AC signals. There is therefore the problem that, in order to compute the power consumptions therefrom, complicated signal processing is required, resulting in the load of the logic circuit, such as CPU, being correspondingly high.

Accordingly, it is an object of the present invention to provide a network relay device, which requires no complicated signal processing, but allows monitoring power consumption at low cost.

According to a feature of the invention, a network relay device comprises:

a main functional portion including a relaying function for network communication;

a power supply portion for converting an AC current taken from an external AC power supply to a DC current, and providing the DC current to the main functional portion;

a measuring unit for measuring a value of the DC current, after the conversion to the DC current provided from the power supply portion to the main functional portion; and a computing unit for computing a total power consumption of a whole including the main functional portion and the power supply portion, based on a result measured by the measuring unit.

The network relay device may further comprise a storing unit for pre-storing a function representing a variation in an efficiency of the power supply portion depending on a magnitude of a power consumption of the main functional portion which is a load of the power supply portion when the relaying function of the main functional portion is actually used, in which the computing unit computes the total power consumption by use of the power consumption of the main functional portion computed based on the result measured by the measuring unit, and the efficiency of the power supply portion obtained from the function.

The computing unit may compute the total power consumption by taking a voltage value of the DC current after the conversion of the DC current provided from the power supply portion to the main functional portion as a known rated voltage value, and using the power consumption of the main functional portion computed from the rated voltage value and the DC current value measured by the measuring unit, and the efficiency of the power supply portion obtained from the function.

The measuring unit may further measure a DC voltage value after the conversion to the DC current provided from the power supply portion to the main functional portion, and the computing unit may compute the total power consumption by use of the power consumption of the main functional portion computed from the DC current value and the DC voltage value measured by the measuring unit, and the efficiency of the power supply portion obtained from the function.

The computing unit may compute the total power consumption by taking the efficiency of the power supply portion as a pre-fixed typical value, regardless of the result measured by the measuring unit.

The main functional portion may further include a unit for transmitting a result computed by the computing unit from a port connected to a network, as a network signal.

The network relay device may further comprise:

a chassis for receiving the main functional portion and the power supply portion; and a circuit board for detachably connecting the main functional portion and the power supply portion together via connectors respectively within the chassis, the circuit board forming a power supply line extending from the power supply portion to the main functional portion with the main functional portion and the power supply portion connected together, in which the measuring unit includes an electric current monitor for measuring the DC current value on the power supply line at the end of the connector leading to the main functional portion.

The chassis may receive a plurality of the main functional portions therein, the measuring unit may make measurements separately for each of the plurality of the main functional portions, and the computing unit may compute the total power consumption from separate results measured by the measuring unit.

(Points of the Invention)

According to the embodiment of the invention, the measuring unit is provided for the main functional portion, so that, after the conversion to the DC current provided from the power supply portion to the main functional portion, the measuring unit measures a value of the DC current. No complicated signal processing is required. Power consumption monitoring can be made at low cost.

BRIEF DESCRIPTION OF THE DRAWINGS

The preferred embodiments according to the invention will be explained below referring to the drawings, wherein:

FIG. 4 is a schematic perspective view showing a network relay device in embodiment 2.

DETAILED DESCRIPTION OF THE PREFERRED EMBODIMENTS

Below are described preferred embodiments according to the invention, by reference to the accompanying drawings. Embodiments 1 and 2 are described below as examples, but the invention is not limited to these embodiments 1 and 2.

Embodiment 1

Figure 1:
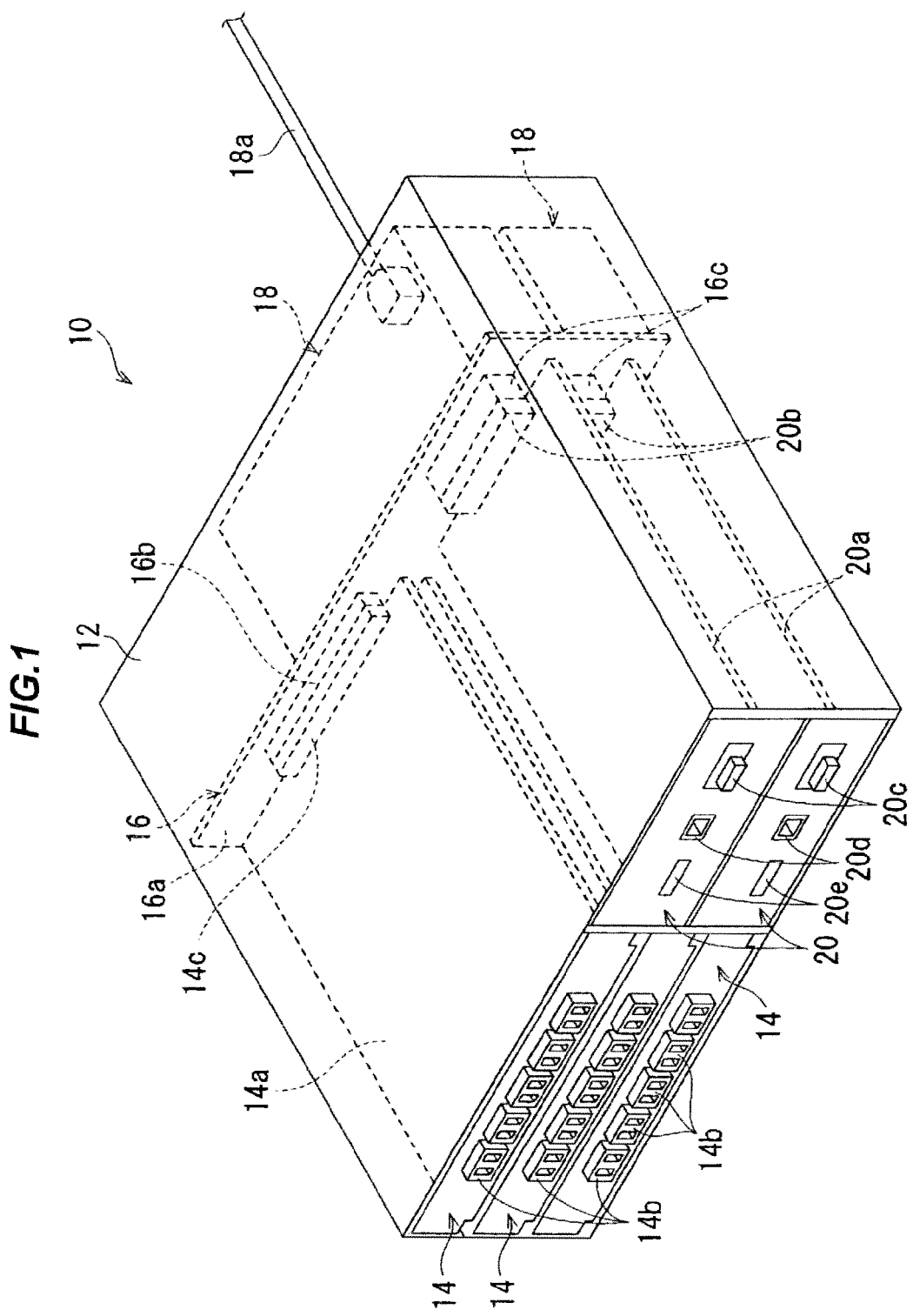
FIG. 1 is a schematic perspective view showing a network relay device in embodiment 1.

Referring to FIG. 1, there is shown a schematic perspective view showing a network relay device 10 in embodiment 1. Incidentally, in FIG. 1, besides an outer form of the network relay device 10, an inner configuration thereof is partially indicated by broken lines. Because the configuration of the network relay device 10 is well known, its outline is explained herein.

The network relay device 10 in embodiment 1 is, for example, a chassis type switch with a chassis 12, and, for example, a plurality of (herein, three) card modules 14 are received in an inner portion of the chassis 12. Each card module 14 is mounted with circuit board 14a based electronic components of each kind (not shown), and is formed with a wiring pattern (not shown) for connecting these electronic components. This results in a main functional portion with a relaying function for network communication, i.e. a network relay circuit (not particularly shown) being formed for each card module 14.

Incidentally, each card module 14 is provided with a plurality of ports 14b (the reference numeral being not shown for all of them), and these ports 14b are exposed at an outer surface of the chassis 12. Connecting a network cable not shown to these ports 14b allows the network relay device 10 to be used as an edge switch or a core switch.

Also, a switch fabric 16 is installed in an inner portion of the chassis 12. This switch fabric 16 has a function for controlling frame forwarding between the different card modules 14, for example. The switch fabric 16 is also mounted with circuit board 16a based electronic components of each kind (not shown), and is also formed with a wiring pattern (not shown) for connecting these electronic components.

The above mentioned card modules 14 are mounted with connectors 14c respectively, and the switch fabric 16 opposite (facing) to the card modules 14 is mounted with connectors 16b, the number of which is the same as the number of card modules 14 received in the chassis 12. With each card module 14 received in the chassis 12, the connectors 14c therefor are connected to the corresponding connectors 16b respectively. Although in FIG. 1 the connectors 14c and 16b are shown only for the card module 14 positioned at the top tier when viewed in the height direction, the connectors 14c and 16b are also being provided for each of the card modules 14 positioned at the second tier (intermediate tier) and the third tier (bottom tier) respectively. Incidentally, the card modules 14 may be formed with not the connectors 14c arranged thereon, but connecting terminals aligned in a pattern shape along a margin of the circuit boards 14a In this case, the card modules 14 are connected together by inserting the aligned connecting terminals into the connectors 16b, respectively, of the switch fabric 16.

Further, for example, two power supply units 18 are installed in an inner portion of the chassis 12 as power supply portions. That is, in this example, one network relay device 10 has the two built-in power supply units 18, to thereby ensure so-called power supply redundancy. The power supply units 18 take commercial AC power (e.g. AC 100-240V) supplied through, for example, a power supply cord 18a from outside, and convert AC to DC current and voltage, to produce and supply internal DC power (e.g. DC 5 V). Although not particularly depicted herein, the power supply cord 18a is being connected to each power supply unit 18 separately.

The power supply units 18 are likewise being connected via connectors respectively not shown, to the switch fabric 16. The internal DC power produced by the power supply units 18 is provided through these connectors to the switch fabric 16, and further distributed (provided) from the switch fabric 16 through the connectors 16b to each card module 14. To this end, the switch fabric 16 is being formed with power supply lines (not shown) extending from the power supply units 18 to each card module 14, and the above mentioned connectors 16b, etc. are arranged along these power supply lines respectively.

Besides, for example, two management cards 20 are received in an inner portion of the chassis 12. The management cards 20 have a function for setting, management or the like for operating the network relay device 10, for example. Incidentally, one of the two management cards 20 is auxiliary, and the auxiliary management card 20 is off (not in use) in a normal state. The management cards 20 each have external interfaces 20c and 20d (serial ports of each kind) or a card memory slot 20e, and these interfaces 20c and 20d or slots 20e are exposed at an outer surface of the chassis 12.

The management cards 20 are also mounted with circuit board 20a based electronic components of each kind (not shown), and are also formed with a wiring pattern (not shown) for connecting these electronic components. The circuit boards 20a are mounted with connectors 20b respectively, and the switch fabric 16 opposite (facing) to the circuit boards 20a is also mounted with connectors 16c separately, the number of which is the same as the number of management cards 20 received in the chassis 12. With each management card 20 received in the chassis 12, the connectors 20b therefor are then connected to the corresponding connectors 16c respectively.

Figure 2:
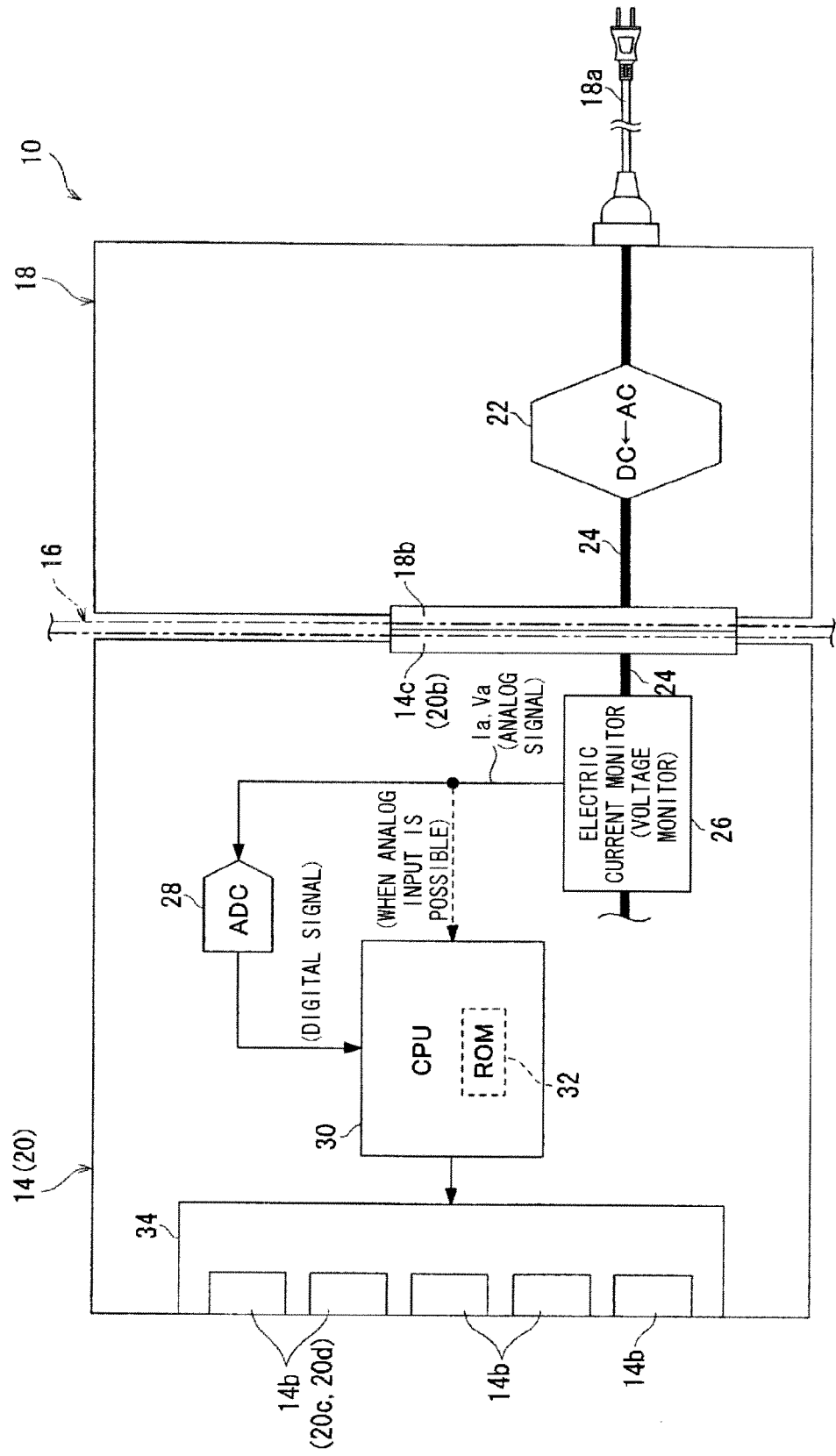
FIG. 2 is a simplified block diagram showing a configuration of the network relay device.

Referring next to FIG. 2, there is shown a simplified block diagram showing a configuration of the network relay device 10. In this block diagram, there is shown a configuration of a power monitoring circuit given in embodiment 1 as one example. Herein is described the power monitoring circuit specific to embodiment 1 with reference to FIG. 2.

The configuration of the network relay device 10 is simplified so that it can, as shown in the block diagram of FIG. 2, be divided into the card module 14 as the main functional portion, and the power supply unit 18 as the power supply portion. Besides, the management card 20 is included in the configuration of the main functional portion. In order to prevent the complexity of the illustration, the card module 14 is shown herein as the typical element of the main functional portion, but the management card 20 is omitted in the figure. Incidentally, in FIG. 2, for the management card 20, its reference numeral is parenthesized.

In the actual network relay device 10, the above described switch fabric 16 is being interposed between each of the card module 14 and the management card 20, and the power supply unit 18. In view of the power supply line extending from the power supply unit 18 to the card module 14 or the management card 20, however, the configuration of the switch fabric 16 can be considered as being omitted (simplified) herein. To this end, in FIG. 2, for convenience, the card module 14 or the management card 20 and the power supply unit 18 are shown as being detachably connected together via the connector 14c (20b) and a connector 18b.

(Power Supply Unit)

As described above, the power supply unit 18 produces and supplies internal DC power from an external AC power supply. To this end, the power supply unit 18 has, for example, an AC to DC converter 22, so that this AC to DC converter 22 converts an AC current taken through the power supply cord 18a from outside, to a DC current to be converted to an appropriate voltage, and supplied to the card module 14.

(Power Supply Line)

The DC power converted by the power supply unit 18 is supplied (distributed) through, for example, a power supply line 24 as shown in FIG. 2, to the card module 14 and the management card 20. Accordingly, the above mentioned connectors 14c and 18b are arranged along the power supply line 24 extending from the power supply unit 18 (via the switch fabric 16 not shown) to each of the card module 14 and the management card 20.

(Main Functional Portion)

As described above, the card module 14 and the management card 20 constitute the main functional portion in the network relay device 10. That is, the card module 14 has the relaying function for network communication (network frame forwarding) in a network (not shown) to which the network relay device 10 is connected. Incidentally, as having already been mentioned, the management card 20 has the setting or managing function for operating the network relay device 10.

(Power Monitoring Circuit)

The power monitoring circuit specific to embodiment 1 is formed for the card module 14, for example. Also, a power monitoring circuit is likewise formed for the management card 20 not shown. Although herein the configuration of the power monitoring circuit is described by way of example of the card module 14, the management card 20 is also configured in the same manner.

The power monitoring circuit is constructed primarily of an electric current monitor 26 and a CPU 30. Of these, the electric current monitor 26 is a magnetic proportional sensing device using a Hall element, for example. The electric current monitor 26 measures a value of electric current along the power supply line 24 at the end of the connector 14c. The electric current value measured here is the value after being converted by the power supply unit 18 to DC current.

The electric current monitor 26 outputs an analog signal (voltage signal) proportional to the electric current value (Ia) measured. To this end, the power monitoring circuit has an ADC 28, so that the analog signal output from the electric current monitor 26 is converted by the ADC 28 to a digital signal and is input to the above mentioned CPU 30.

Also, the electric current monitor 26 may have a separate built-in voltage monitoring function. The voltage monitor (with no separate reference numeral added thereto) may be configured to use a resistive element, for example. Such a voltage monitor measures a value of voltage along the power supply line 24 at the end of the connector 14c The voltage value measured here is also the value after being converted by the power supply unit 18 to DC current.

The voltage monitor outputs an analog signal (voltage signal) proportional to the voltage value (Va) measured. When the voltage monitor is provided, a signal line and an ADC on a different channel from the electric current monitor 26 may be used to convert the analog signal to a digital signal, and input it to the above mentioned CPU 30.

Incidentally, as indicated by a broken line in FIG. 2, for example, when the CPU 30 has an analog input terminal, the ADC 28 may be not particularly used, but the analog signal (electric current value Ia, voltage value Va) from the electric current monitor 26 or the voltage monitor may be input directly to the CPU 30.

Besides, the above mentioned ports 14b or a forwarding unit 34 is schematically depicted herein to constitute the card module 14. The forwarding unit 34 identifies a transmitting port 14b number, based on, for example, an FDB (Forwarding Data Base) not shown, when performing frame forwarding. Incidentally, for the configuration of the management card 20, there is provided no forwarding unit 34. Also, for the management card 20, the configuration of the ports 14b is equivalent to the configuration of the external interfaces 20c and 20d.

In the card module 14, the above mentioned CPU 30 is a logic circuit for integrated control of the frame forwarding, and constitutes the power monitoring circuit by exploiting a resource of the CPU 30 in embodiment 1. Also, for the management card 20, the CPU 30 thereof principally controls the setting or management for operating the network relay device 10. In either case, the CPU 30 can compute power consumption by use of, for example, any of a plurality of methods listed below. The power consumption computing methods used in embodiment 1 are described below.

(First Computing Method)

First, the CPU 30 computes a local power consumption w for each of the card modules 14 and the management cards 20, from the electric current value Ia and the voltage value Va measured by the electric current monitor 26 and the voltage monitor, respectively, as mentioned above Incidentally, for the management cards 20, currently used one thereof is to be computed, but unused (auxiliary) one may be not computed. The power consumption w for each of the card modules 14 and the currently used management card 20 can be expressed in terms of the product of the electric current value Ia and the voltage value Va, for example Incidentally, in practice, the computing is made by appropriately converting each voltage signal indicative of the electric current value Ia and the voltage value Va in the CPU 30.

Although in FIG. 2 there is shown one card module 14, a device (chassis type switch) which operates with a plurality of the card modules 14 mounted in one chassis 12, as with the network relay device 10 in embodiment 1, can compute the local power consumption w for each card module 14, by the power monitoring circuit being mounted for each card module 14.

For example, let the three card modules 14 be "module A," "module B," and "module C," respectively. If the modules A. B, and C are mounted with different functions (the numbers of ports used, or communication bands) respectively, then the respective local power consumptions w of the modules A, B, and C naturally also differ.

Even in such a case, mounting the power monitoring circuit for each card module 14 allows such operation as to compute the local power consumption w for the "module A," the local power consumption w for the "module B," and the local power consumption w for the "module C." This allows the more detailed power consumption management of the network relay device 10.

Next, the CPU 30 of the management card 20 for example is a master, to integrate the local power consumption w data from the CPUs 30 of the other card modules 14, respectively. That is, each card module 14 computes its local power consumption w using its power monitoring circuit, and then transmits the computed result thereof to the CPU 30 of the management card 20. The CPU 30 of the management card 20 computes a total of the local power consumptions w received from the separate card modules 14, respectively. Here, the totaled power consumption w can include the local power consumption w computed by the management card 20 itself.

Following that, the CPU 30 of the management card 20 computes an efficiency of the power supply units 18, depending on the total of the respective local power consumptions w of the card modules 14 and the management card 20. Here, the power supply units 18 are known to have an efficiency characteristic curve (load factor–efficiency curve), depending on the magnitudes of the local power consumptions w of the card modules 14 and the management card 20, which become load. This efficiency curve can be expressed as $\eta(w)$, a function of the totaled power consumption w of the card modules 14 and the management card 20.

The CPU 30 of the management card 20 has, for example, a built-in ROM (Read Only Memory) 32, so that this ROM 32 can pre-store data for the function $\eta(w)$, whereby the CPU 30 of the management card 20 can compute the efficiency of the power supply units 18 from the total of the respective local power consumptions w of the card modules 14 and the management card 20.

(Computing Total Power Consumption P)

The CPU 30 of the management card 20 can then compute a total power consumption P of a whole including the card modules 14, the management card 20 and the power supply units 18, i.e. the total power consumption P of the whole of the network relay device 10, from Formula (1) below.

$$P=w/\eta(w) \quad (1)$$

In Formula (1) above, the w value is the total of the respective local power consumptions w of the card modules 14 and the management card 20 integrated by the CPU 30 which is the master.

Incidentally, although herein is given the example of computing the total power consumption P step by step in such a manner as to compute the "local power consumptions w (and total thereof)→efficiency ($\eta(w)$)→total power consumption P," it is found that the resulting total power consumption P can uniquely be computed from the electric current value Ia and the voltage value Va measured. Accordingly, rather than computing the total power consumption P step by step in this manner, computing the total power consumption P directly by taking the electric current value Ia and the voltage value Va as arguments may be employed as computing logic for the CPU 30 of the management card 20.

Also, for the data for the function $\eta(w)$ to be stored in the ROM 32, precise samples thereof can be pre-acquired by, for example, when actually using the network relay device 10, partly switching on or off each kind of function of the card modules 14 or the management card 20 to thereby vary the power consumptions w thereof, and on a moment to moment basis, measure the total power consumption P with a power meter. The data acquired in this manner may be pre-stored in the ROM 32 of the management card 20 as the function $\eta(w)$.

(Second Computing Method)

Next, a second computing method is described. In the second computing method, rather than the function $\eta(w)$ for example being used to compute the efficiency of the power supply units 18, a pre-fixed typical value for the efficiency thereof is used to compute the total power consumption P. Incidentally, computing the respective local power consumptions w of the card modules 14, transmitting these local power consumptions w to the management card 20 and totaling them with the CPU 30 thereof being the master is performed in the same way as in the first computing method.

That is, because the power supply units 18 used in embodiment 1 are mounted on the network relay device 10 as high efficiency power supplies, the pre-fixed typical value (e.g. a value fixed at 85% to 90% or higher) may be substituted in the denominator of Formula (1) above to compute the total power consumption P. In this case, the computing formula is as follows:

$$P=w/\eta typ \quad (2)$$

In Formula (2) above, $\eta typ$ is the fixed typical value for the efficiency of the power supply units 18.

In the second computing method, the reason for taking the efficiency as the typical value is as follows: Assuming, for example, that the total power consumption P of the whole of the network relay device 10 is 1000 W, and the efficiency of the power supply units 18 is 87%, the loss in the power supply units 18 is 13% equivalent to 130 W. In this case, if a variation of ±10% in the loss caused in the power supply units 18 is estimated versus actual load variation, then an error of 13 W occurs in the computed total power consumption P, but such a degree of error is only on the order of 1.3% of 1000 W, the total power consumption P of the whole. Accordingly, instead of dynamically computing the efficiency of the power supply units 18 from the function η(w), it is possible to use the pre-fixed typical value for the efficiency thereof, when wanting to know such an estimated value for the total power consumption P as to cause no practical problem.

In this manner, the second computing method used for computing the total power consumption P requires no pre-storing of the data for the function η(w) in the ROM 32, therefore allowing production cost to be correspondingly lowered. Also, because no pre-measuring and acquiring of the data for the function η(w) is required, the number of production steps can further be reduced. Also, because the throughput (the number of processing steps) required for computing the total power consumption P is low (small), the processing load of the CPU 30 can be correspondingly reduced.

(Third Computing Method)

Next, a third computing method is described. In the third computing method, the card modules 14 and the management card 20 for example do not use their respective voltage monitors to measure the voltage value Va, but a known rated voltage value to pre-compute the total power consumption P. Also, in the third computing method, computing the respective local power consumptions w of the card modules 14, transmitting these local power consumptions w to the management card 20 and totaling them with the master CPU 30 thereof is performed in the same way as in the first computing method.

That is, in practice, it is clear that the output voltage (DC voltage) from the power supply units 18 generally falls within an error range on the order of ±2-3%. For this, even if rather than the voltage monitors being used to measure the voltage value Va in real time, the known rated voltage value is used to pre-compute the total power consumption P of the card modules 14 and the management card 20, there is no problem in particular in wanting to know an estimated value for the total power consumption P.

Accordingly, in the third computing method, the total power consumption P may be computed by using the known rated voltage value (e.g. DC 5 V), pre-computing the local power consumptions w, and substituting them into Formula (1) or (2).

In this manner, the third computing method used for computing the total power consumption P requires no voltage monitors, signal lines therefor, ADC and the like, therefore allowing the configuration of the power monitoring circuit to be correspondingly simplified. Also, because no voltage value dynamic monitoring is required for computing, there is the significant advantage that the processing load of the CPU 30 can be correspondingly reduced.

(Fourth Computing Method)

Further, a fourth computing method is described. The fourth computing method uses the second computing method to substitute the typical value in the denominator of Formula (1) above, and the third computing method to treat the voltage value as the rated voltage value. Also, in the fourth computing method, computing the respective local power consumptions w of the card modules 14, transmitting these local power consumptions w to the management card 20 and totaling them with the CPU 30 thereof is performed in the same way as in the first computing method.

The fourth computing method is further convenient in that it has both the benefit of the second computing method and the benefit of the third computing method. It should be noted, however, that the computed total power consumption P includes both an error in the efficiency and an error in the supplied voltage. Therefore, attention to allowable limits of error thereof is required in employing the fourth computing method.

(Transmitting Function)

Also, in embodiment 1, as described above, the total power consumption P is computed by the CPU 30 of the management card 20, its computed result can be transmitted via a network. That is, on computing the total power consumption P, the CPU 30 of the management card 20 can transmit a management frame including the computed result, from either the external interface 20c or 20d.

Such a management frame transmitting function can be realized by use of, for example, an SNMP (Simple Network Management Protocol). That is, the CPU 30 of the management card 20 can function as an SNMP agent, so that a routine to transmit the computed total power consumption P may be built in that agent function.

In this case, for example, a management terminal connected to a network not shown transmits a request to the agent of the currently used management card 20 by polling it, and the agent can respond thereto to transmit the management frame. Or, the agent may, regularly or as needed (e.g. during load varying, etc.), compute the total power consumption P, and transmit its computed result to the management terminal as the management frame.

Comparison with a Comparative Example

Although the advantages of the power monitoring circuit specific to embodiment 1 have already been clear from the above description, a comparative example to embodiment 1 is given below. By comparison with this comparative example, the usefulness of embodiment 1 is further verified.

Figure 3:
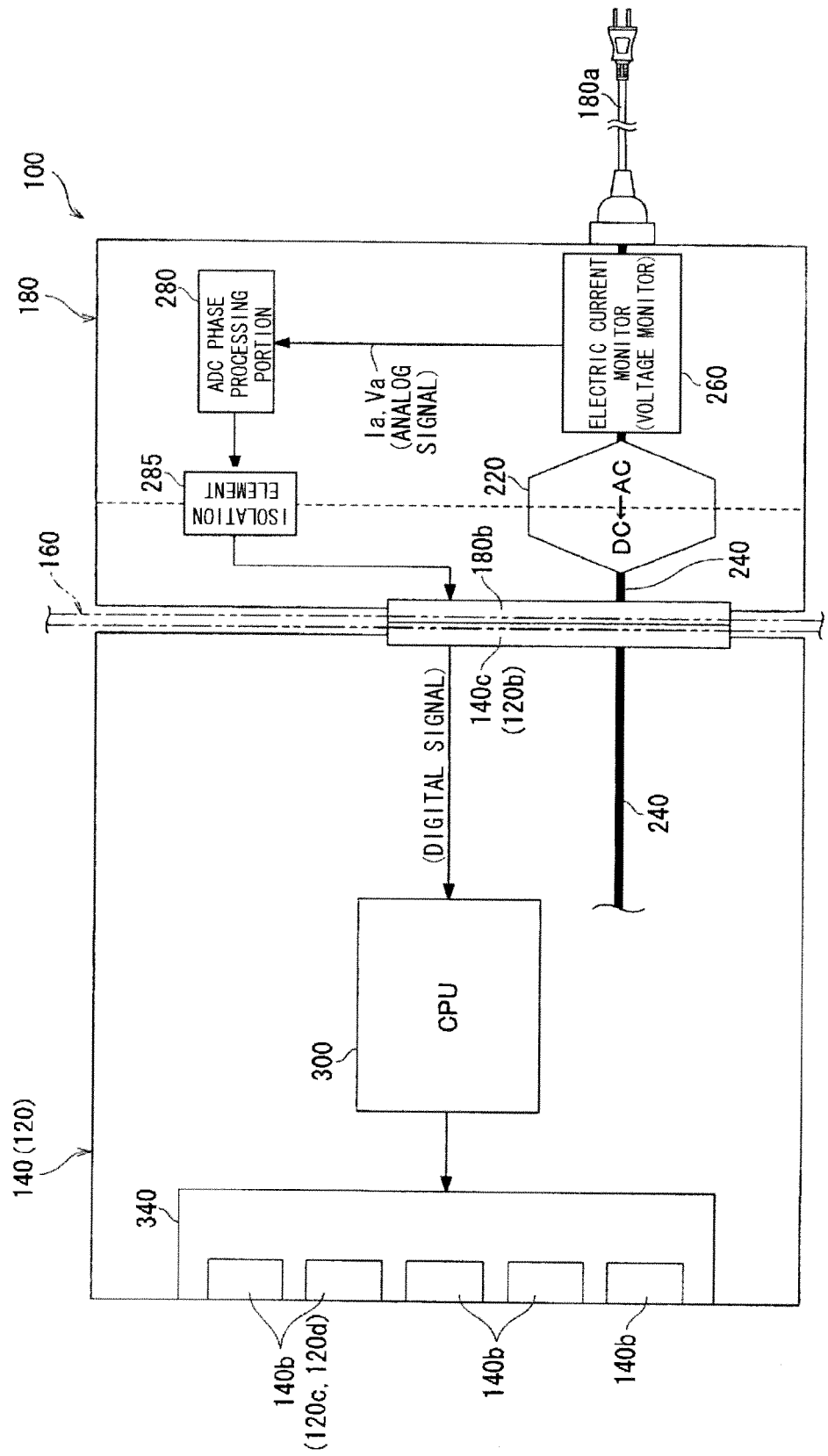
FIG. 3 is a schematic block diagram showing a configuration of a network relay device in a comparative example mounted with a power monitoring circuit.

Referring to FIG. 3, there is shown a schematic block diagram showing a configuration of a network relay device 100 in the comparative example mounted with a power monitoring circuit. In the comparative example of FIG. 3, for preventing confusion with embodiment 1, the network relay device 100 is to be compared with the network relay device 10 in embodiment 1, and has a card module 140 configured as a main functional portion of the network relay device 100, and a power supply unit 180 configured as a power supply portion of the network relay device 100, but respective basic functions of the card module 140 and the power supply unit 180 are the same as in embodiment 1. In FIG. 3, for preventing confusion, reference numerals different from in embodiment 1 are also used appropriately for the other detailed constituent elements, but respective corresponding basic functions thereof are the same as in embodiment 1.

The comparative example of FIG. 3 is however significantly different from embodiment 1 in that the power monitoring circuit in the comparative example is mounted not on the card module 140 or the management card 120, but on the power supply unit 180. Such a difference is common with such conventional general art as to monitor power consumption at a power supply portion (i.e. an entrance of an AC power supply) of each electronic device.

To this end, in the comparative example, the electric current monitor 260 and the voltage monitor are arranged, for example, at the entrance to the AC to DC converter 220. In this case, the measured results are AC current and AC voltage, and in practice, the ADC (phase processing portion) 280 therefore needs to be provided within the power monitoring circuit. The ADC (phase processing portion) 280 is a high precision device for monitoring a phase difference between voltage and electric current measured by the electric current monitor 260 and the voltage monitor.

Also, in the comparative example, when monitored signals (Ia, Va) after being converted by the ADC (phase processing portion) 280 to digitals are input to the card module 140 or the management card 120, an isolation element 285 needs to be interposed therebetween. This is based on it being necessary to ensure the electrical isolation between the primary side (AC side) and the secondary side (DC side) of the AC to DC converter 220 from the point of view of safety. Incidentally, the isolation element 285 is a signal relay device having electrical isolation properties, such as a photo-coupler, for example.

In this manner, the network relay device 100 as shown in the comparative example of FIG. 3 has the following drawbacks:
(1) The high precision ADC 280 is required for the phase processing portion, therefore resulting in the production cost being correspondingly high.
(2) The measured results are the AC signals. In computing the power consumptions w, complicated sampling or computing is therefore required, resulting in the load of the CPU 300 being correspondingly excessive.
(3) The separate signal line from the power supply unit 180 to the card module 140 or the management card 120 is required, resulting in the wiring system including the switch fabric 160 being correspondingly complicated.
(4) The isolation element 285 is required to be interposed along the signal line between the power supply unit 180 and the card module 140 or the management card 120, resulting in correspondingly high cost.

In contrast, the network relay device 10 in embodiment 1 has no drawbacks (1) to (4) above. With embodiment 1, cost can therefore be lowered more than with the comparative example, and the use of the recent high efficiency power supplies allows computing the total power consumption P with adequate practical accuracy, even with the simple configuration.

As described above, the network relay device 10 in embodiment 1 allows monitoring power consumption at low cost. Also, even when there are a plurality of the card modules 14 which are the main functional portion, the more detailed power consumption management can be made by the power monitoring circuit being mounted for each of the card modules 14.

Embodiment 2

Next, embodiment 2 according to the invention is described.

Referring to FIG. 4, there is shown a schematic perspective view showing a network relay device 210 in embodiment 2. Although in embodiment 1 the network relay device 10 has been given as the example of the chassis type switch, the network relay device 210 in embodiment 2 differs therefrom in that it is a so-called box type switch. Herein, its different points from embodiment 1 are mainly described, but its common overlapping points with embodiment 1 are appropriately omitted.

The network relay device 210 in embodiment 2 has a box type case (chassis) 212, and this case 212 has one built-in main board 214 therein. The main board 214 is mounted with, for example, electronic components of each kind (not shown) on its circuit board 214a, and is formed with a wiring pattern (not shown) for connecting these electronic components. As with the above described card module 14, this main board 214 is also formed with a main functional portion with a relaying function for network communication.

The main board 214 is provided with a plurality of ports 214b (the reference numeral being not shown for all of them), and these ports 214b are also exposed at a front surface of the case 212. Also, in embodiment 2, the main board 214 has the same built-in function as the above described management cards 20. To this end, the main board 214 is provided with the same external interfaces 20c and 20d as described above, and these interfaces 20c and 20d are exposed at a front surface of the case 212.

As with embodiment 1, two power supply units 18 are installed in an inner portion of the case 212, to thereby ensure power supply redundancy. Incidentally, the configuration and function of the power supply units 18 are the same as in embodiment 1. Within the case 212, the main board 214 and the power supply units 18 are connected via a relay terminal strip 216, for example. In embodiment 2, no switch fabric 16 function is built in the relay terminal strip 216.

The relay terminal strip 216 is provided with, for example, connectors 216b on both sides, respectively, of its board 216a (in FIG. 4, only the front side one of the connectors 216b is shown) In correspondence with these connectors 216b, there are provided a connector 214c for the circuit board 214a of the main board 214, and a connector not shown for the power supply units 18 as well. The board 216a of the relay terminal strip 216 is formed with a power supply line (not shown) to connect the connectors 216b on both the sides of the board 216a together, so that the internal DC power produced by the power supply units 18 is provided through the connectors 216b and the power supply line to the main board 214.

In embodiment 2, the main board 214 is configured as the main functional portion as in the block diagram of FIG. 2. To this end, the power monitoring circuit is formed for the circuit board 214a of the main board 214.

The CPU 30 of the power monitoring circuit can compute a local power consumption w of the main board 214, and from Formula (1) above, compute a total power consumption P of the whole of the network relay device 210. In embodiment 2, the above described first to fourth computing methods may likewise be applied thereto. Also, the computed total power consumption P can be transmitted to outside through either the external interface 20c or 20d.

With the network relay device 210 in embodiment 2 described above, power consumption thereof can also be monitored at low cost and with good accuracy, by applying the same power monitoring circuit as in embodiment 1 thereto.

The invention is not limited to above described embodiments 1 and 2, but may variously be modified and practiced. Although in embodiment 1 the management card 20 totals the respective local power consumptions w of the card modules 14, and computes the total power consumption P from the totaled power consumption w thereof, the CPU 30 of each card module 14 may compute the total power consumption P.

Also, although in each embodiment the resource of the CPU 30 is exploited to compute the total power consumption P, a separate exclusive logic IC may be added to, for example, the card modules 14 or the management card 20, the main board 214 or the like to compute the local power consumptions w or the total power consumption P.

Besides, the configuration of the network relay device 10 or 210 described in each embodiment may partially be modified or replaced.

Although the invention has been described, the invention according to claims is not to be limited by the above-mentioned embodiments and examples. Further, please note that not all combinations of the features described in the embodiments and the examples are not necessary to solve the problem of the invention.

What is claimed is:

1. A network relay device, comprising:
a main functional portion including a relaying function configured for network communication;
a power supply portion configured to convert an AC current taken from an external AC power supply to a DC current, and provide the DC current to the main functional portion;
a chassis configured to receive the main functional portion and the power supply portion;
a connector configured to detachably connect the main functional portion and the power supply portion within the chassis;
a measuring unit configured to measure a value of the DC current, after the conversion to the DC current provided from the power supply portion to the main functional portion;
a computing unit configured to compute a total power consumption of a whole including the main functional portion and the power supply portion, based on a result measured by the measuring unit;
a storing unit configured to pre-store a function representing a variation in an efficiency of the power supply portion depending on a magnitude of a power consumption of the main functional portion which is a load of the power supply portion when the relaying function of the main functional portion is actually used; and
a circuit board configured to form a power supply line extending from the power supply portion to the main functional portion with the main functional portion and the power supply portion connected together,
wherein the computing unit is configured to compute the total power consumption by using the power consumption of the main functional portion computed based on the result measured by the measuring unit, and the efficiency of the power supply portion obtained from the function, and
wherein the measuring unit includes an electric current monitor provided between the connector and the main functional portion and configured to monitor the DC current value on the power supply line.

2. The network relay device according to claim 1, wherein the computing unit is configured to compute the total power consumption by taking a voltage value of the DC current after the conversion of the DC current provided from the power supply portion to the main functional portion as a known rated voltage value, and using the power consumption of the main functional portion computed from the rated voltage value and the DC current value measured by the measuring unit, and the efficiency of the power supply portion obtained from the function.

3. The network relay device according to claim 1, wherein the measuring unit is further configured to measure a DC voltage value after the conversion to the DC current provided from the power supply portion to the main functional portion, and the computing unit is configured to compute the total power consumption by use of the power consumption of the main functional portion computed from the DC current value and the DC voltage value measured by the measuring unit, and the efficiency of the power supply portion obtained from the function.

4. The network relay device according to claim 1, wherein the computing unit is configured to compute the total power consumption by taking the efficiency of the power supply portion as a pre-fixed typical value, regardless of the result measured by the measuring unit.

5. The network relay device according to claim 1, wherein the main functional portion further includes a unit configured to transmit a result computed by the computing unit from a port connected to a network, as a network signal.

6. The network relay device according to claim 1, wherein the chassis receives a plurality of the main functional portions therein, the measuring unit is configured to make measurements separately for each of the plurality of the main functional portions, and the computing unit is configured to compute the total power consumption from separate results measured by the measuring unit.

7. A network relay device, comprising:
a main functional portion including a relaying function configured for network communication;
a power supply portion configured to convert an AC current taken from an external AC power supply to a DC current, and provide the DC current to the main functional portion;
a chassis configured to receive the main functional portion and the power supply portion;
a connector configured to detachably connect the main functional portion and the power supply portion within the chassis;
a measuring unit configured to measure a value of the DC current, after the conversion to the DC current provided from the power supply portion to the main functional portion;
a computing unit configured to compute a total power consumption of a whole including the main functional portion and the power supply portion, based on a result measured by the measuring unit; and
a circuit board configured to form a power supply line extending from the power supply portion to the main functional portion with the main functional portion and the power supply portion connected together,
wherein the measuring unit includes an electric current monitor provided between the connector and the main functional portion and configured to monitor the DC current value on the power supply line.

8. The network relay device according to claim 7, further comprising:
a storing unit configured to pre-store a function representing a variation in an efficiency of the power supply portion depending on a magnitude of a power consumption of the main functional portion which is a load of the power supply portion when the relaying function of the main functional portion is actually used,
wherein the computing unit is configured to compute the total power consumption by using the power consumption of the main functional portion computed based on the result measured by the measuring unit, and the efficiency of the power supply portion obtained from the function.

9. The network relay device according to claim 7, wherein the main functional portion further includes a unit configured to transmit a result computed by the computing unit from a port connected to a network, as a network signal.

10. The network relay device according to claim 7, wherein the chassis receives a plurality of the main functional portions therein, the measuring unit is configured to make measurements separately for each of the plurality of the main functional portions, and the computing unit is configured to compute the total power consumption from separate results measured by the measuring unit.

* * * * *